United States Patent
Minoyama (10) Patent No.: US 11,794,658 B2
(45) Date of Patent: Oct. 24, 2023

(54) VEHICLE STORAGE STRUCTURE

(71) Applicant: HONDA MOTOR CO., LTD., Tokyo (JP)

(72) Inventor: Wataru Minoyama, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 300 days.

(21) Appl. No.: 17/198,608

(22) Filed: Mar. 11, 2021

(65) Prior Publication Data

US 2021/0284074 A1 Sep. 16, 2021

(30) Foreign Application Priority Data

Mar. 16, 2020 (JP) ................. 2020-045830

(51) Int. Cl.
*B60R 7/08* (2006.01)
(52) U.S. Cl.
CPC ..................... *B60R 7/08* (2013.01)
(58) Field of Classification Search
CPC .... B60R 7/08; B60R 7/04; B60R 7/06; B60R 2011/0005; B60N 3/105
USPC ..... 296/10, 37.12, 70, 24, 34, 37.8; 224/483
See application file for complete search history.

(56) References Cited

U.S. PATENT DOCUMENTS

| | | | | |
|---|---|---|---|---|
| 8,388,042 B2* | 3/2013 | Quijano | ............ | B60R 7/06 296/37.8 |
| 8,465,076 B1* | 6/2013 | Quijano | ............ | B60R 7/04 296/37.8 |
| 8,518,510 B1* | 8/2013 | Wheatley | ............ | B60R 11/02 428/40.1 |
| 9,358,930 B1* | 6/2016 | Sic | ............ | B60R 7/06 |
| 2014/0167438 A1* | 6/2014 | Lambert | ............ | H02J 7/0044 320/108 |
| 2014/0265420 A1* | 9/2014 | Myers | ............ | B60R 7/06 296/70 |
| 2015/0069776 A1 | 3/2015 | Ishibashi et al. | | |
| 2016/0344221 A1* | 11/2016 | Kramer | ............ | H02J 7/0044 |
| 2019/0315290 A1 | 10/2019 | Shinohara | | |
| 2022/0094182 A1* | 3/2022 | Fowler | ............ | H02J 7/00034 |

FOREIGN PATENT DOCUMENTS

| | | | | | |
|---|---|---|---|---|---|
| EP | 1571043 A2 * | 9/2005 | | ............ | B60R 7/04 |
| FR | 2965526 A1 * | 4/2012 | | ......... | B60R 13/0846 |
| FR | 2980751 A1 * | 4/2013 | | ............ | B60R 11/02 |

(Continued)

OTHER PUBLICATIONS

JP 2010137589 machine translation (Year: 2010).*

(Continued)

*Primary Examiner* — Dennis H Pedder
*Assistant Examiner* — Kevin P Weldon
(74) *Attorney, Agent, or Firm* — Rankin, Hill & Clark LLP (57) ABSTRACT

A vehicle storage structure includes a vehicle interior member and a storage. The vehicle interior member has a design surface. The storage has an opening, a first article placement section, and a second article placement section. The opening is located on the design surface. The first article placement section is disposed outwardly from the second article placement section. The first article placement section has a coefficient of friction less than a coefficient of friction of the second article placement section.

20 Claims, 5 Drawing Sheets

(56) References Cited

FOREIGN PATENT DOCUMENTS

| | | |
|---|---|---|
| JP | S61-199442 U | 12/1986 |
| JP | 2000-043648 A | 2/2000 |
| JP | 2000-142175 A | 5/2000 |
| JP | 2002-104083 A | 4/2002 |
| JP | 2005-081895 A | 3/2005 |
| JP | 2007-015523 A | 1/2007 |
| JP | 2009-061959 A | 3/2009 |
| JP | 2010-137589 A | 6/2010 |
| JP | 2010-143309 A | 7/2010 |
| JP | 2011-156949 A | 8/2011 |
| JP | 2011-230694 A | 11/2011 |
| JP | 2014-133503 A | 7/2014 |
| JP | 2015-051698 A | 3/2015 |
| JP | 2016-088433 A | 5/2016 |
| JP | 2018-001854 A | 1/2018 |
| JP | 2019-182324 A | 10/2019 |
| WO | WO-2008043563 A1 * | 4/2008 ............... B60R 7/06 |

OTHER PUBLICATIONS

Office Action received in corresponding Japanese application No. 2020-045830 dated Oct. 5, 2021 with English translation (6 pages).
Office Action received in corresponding Japanese application No. 2020-045830 dated Jan. 18, 2022 with English translation (6 pages).

* cited by examiner

VEHICLE STORAGE STRUCTURE

CROSS REFERENCE TO RELATED APPLICATIONS

This application claims the foreign priority benefit under 35 U.S.C. § 119 of Japanese patent application No. 2020-045830 filed on Mar. 16 2020, the disclosure of which is incorporated herein by reference.

BACKGROUND OF THE INVENTION

1. Field of the Invention

The present invention relates to a vehicle storage structure.

2. Description of the Related Art

There are cases in which storages for storing articles such as mobile terminals or the like are provided on interior members in the passenger compartment of a vehicle.

In recent years, the sizes of mobile terminals have been becoming larger, and hence there are cases in which an end of a stored mobile terminal is close to the opening of a storage. Here, considering the acceleration, deceleration, and the like (for example, including turning) of the vehicle, it can be said that the performance of a storage for holding an article is getting more important.

Japanese Patent Application Publication Nos. 2010-137589 and 2011-156949 (hereinafter called patent documents 1 and 2, respectively) disclose techniques in which a non-slip member is provided on the surface of a storage on which articles are placed.

SUMMARY OF THE INVENTION

The techniques in patent documents 1 and 2 have a non-slip member provided on a wide area (on all the surface on which articles are placed), and thus have problems of high costs.

The present invention has been made in light of the above point, and an object thereof is to provide a vehicle storage structure that makes it possible to achieve both better performance for holding stored articles and lower cost.

In response to the object described above, a vehicle storage structure includes a vehicle interior member and a storage. The vehicle interior member has a design surface. The storage has an opening, a first article placement section, and a second article placement section. The opening is located on the design surface. The first article placement section is disposed outwardly from the second article placement section. The first article placement section has a coefficient of friction less than a coefficient of friction of the second article placement section.

The present invention makes it possible to achieve both better performance for holding stored articles and lower cost.

DETAILED DESCRIPTION OF THE EMBODIMENTS

An embodiment of the present invention will be described in detail with reference to the drawings. In the following description, the same constituents are denoted by the same symbols, and repetitive description thereof is omitted. The expressions meaning directions such as front-rear, upper-lower, and right-left are based on the traveling direction of the vehicle.

Figure 1:
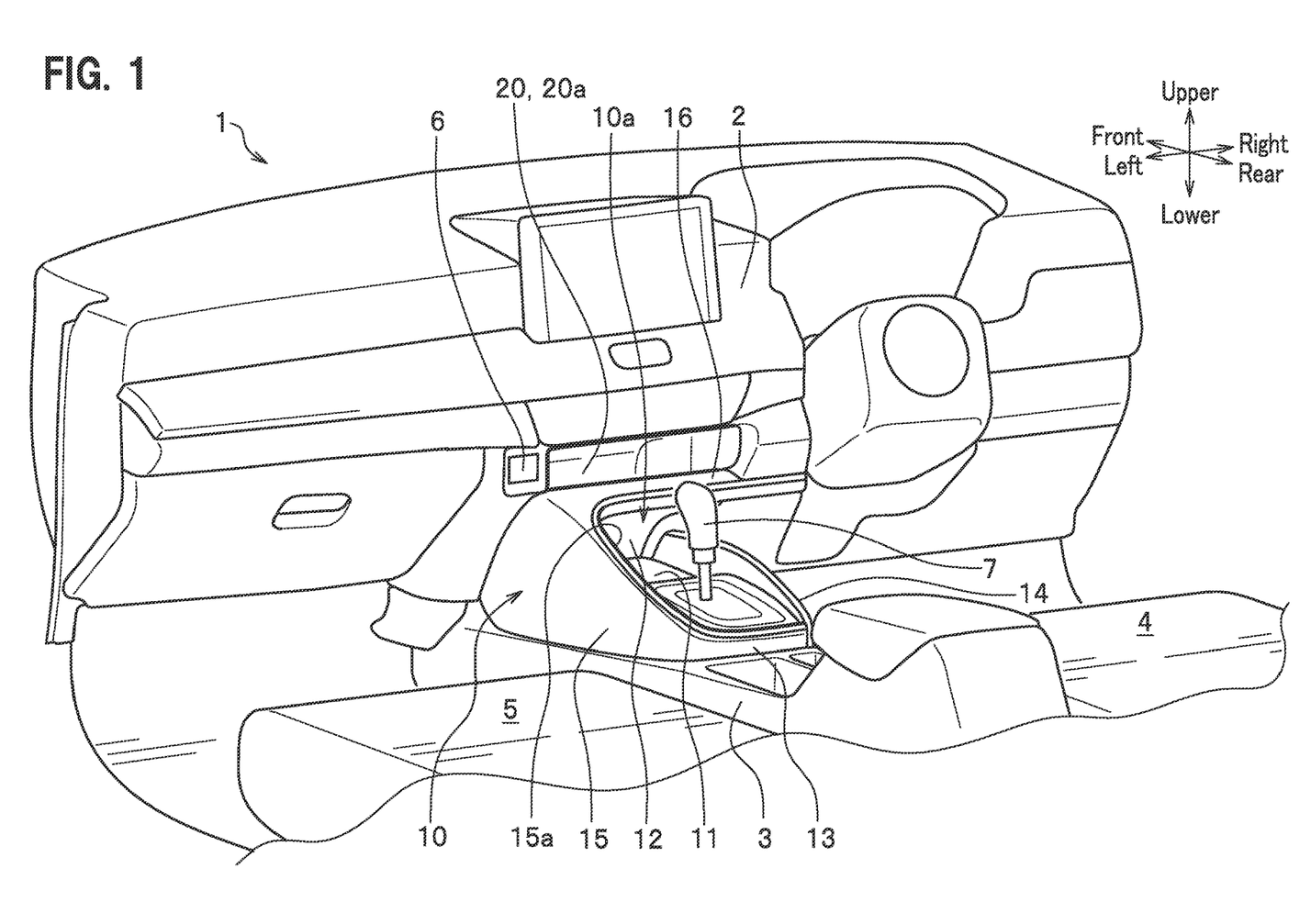
FIG. 1 is a schematic view of a vehicle storage structure according to an embodiment of the present invention from the passenger compartment side.
Figure 2:
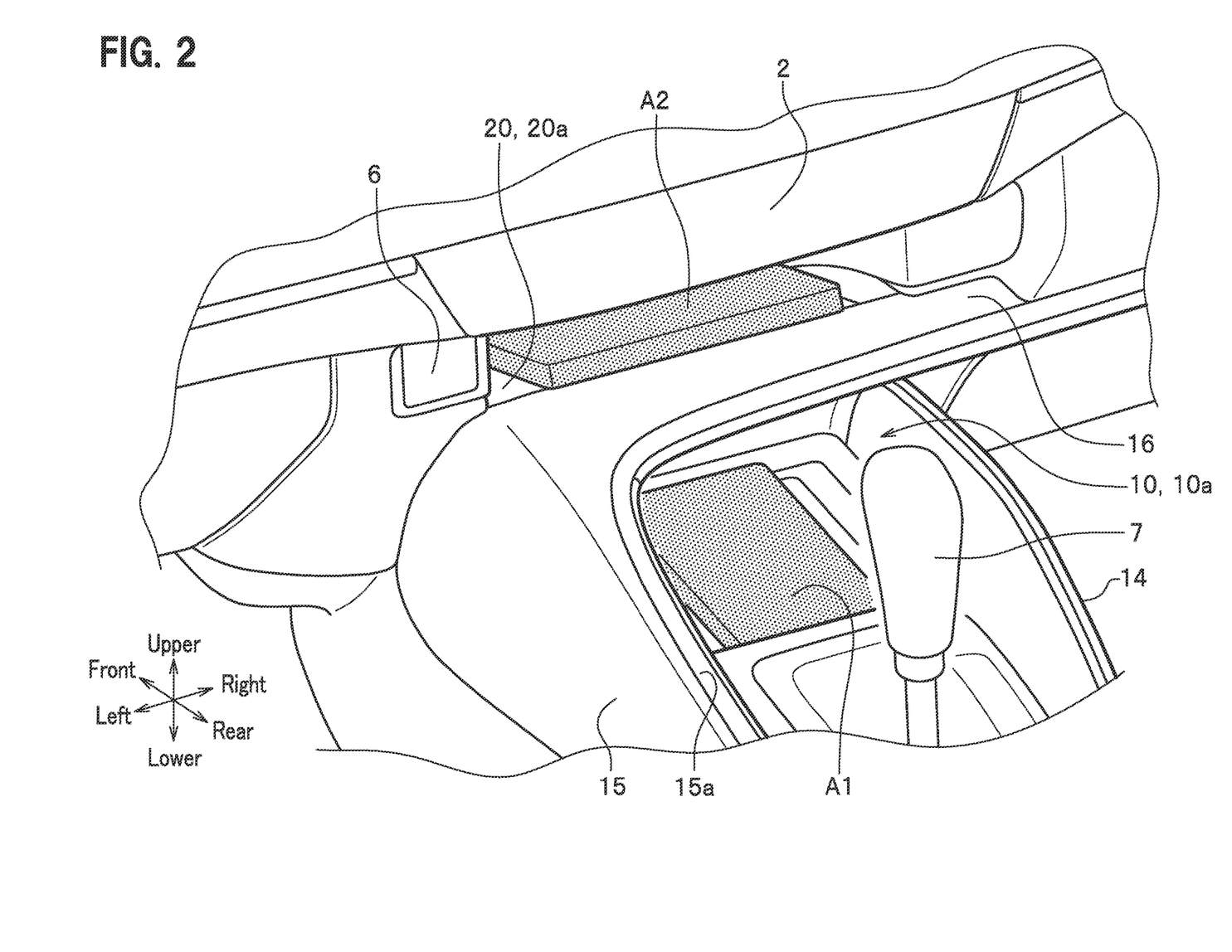
FIG. 2 is a partially enlarged view of FIG. 1.

As illustrated in FIGS. 1 and 2, a vehicle storage structure 1 includes an instrument panel 2, a center console 3, and a connection member 10 and has a first storage and a second storage 20 at at least one of a front portion of the center console 3, a portion in front of the center console 3, and a portion in the instrument panel 2.

<Instrument Panel>

The instrument panel 2 is a kind of vehicle interior member provided in front of the driver's seat 4 and the front passenger seat 5 and is a resin member serving as a design surface on the front side of the passenger compartment. The instrument panel 2 is formed by combining a plurality of members. The instrument panel 2 has the second storage 20 which is described later. The instrument panel 2 also has a connection terminal (for example, a Universal Serial Bus (USB) socket) 6 on the front passenger seat 5 side of the second storage 20 in the vehicle width direction.

<Center Console>

The center console 3 is provided between the driver's seat 4 and the front passenger seat 5 and is a resin member extending in the front-rear direction on the vehicle floor. On the center console 3 is provided an operation device 7. The operation device 7 is operated by the occupant in the driver's seat 4 and thereby operates equipment mounted on the vehicle. The operation device 7, for example, is a shift lever that protrudes upward from the center console 3 and operates a transmission device.

<Connection Member (First Storage)>

The connection member 10 is a resin member connecting the rear side of a lower end portion of the instrument panel 2 and the upper side of a front end portion of the center console 3. The connection member 10 is formed by combining a plurality of members. A front portion of the connection member 10 serves as the first storage used by the occupant of the driver's seat 4. The connection member 10 integrally includes a bottom wall 11, a front wall 12 extending upward from the front end of the bottom wall 11, and a rear rib 13 extending upward from the rear end of the bottom wall 11. The connection member 10 also integrally includes a side rib 14 extending upward from the driver's-seat-4-side end of the bottom wall 11 and a side wall 15 extending upward from the front-passenger-seat-5-side end of the bottom wall 11. The connection member 10 also integrally includes an extension wall (extension portion) 16 extending rearward from the upper end of the front wall 12. In the connection member 10, the opening 10a of the first storage is formed by the driver's-seat-4-side end in the vehicle width direction (the upper portion of the side rib 14) and the upper end and the rear end (between the upper end of the front wall 12 and the rear rib 13). The side wall 15 is provided at an upper portion on the front-passenger-seat-5-side end in the vehicle width direction of the center console 3.

Figure 5:
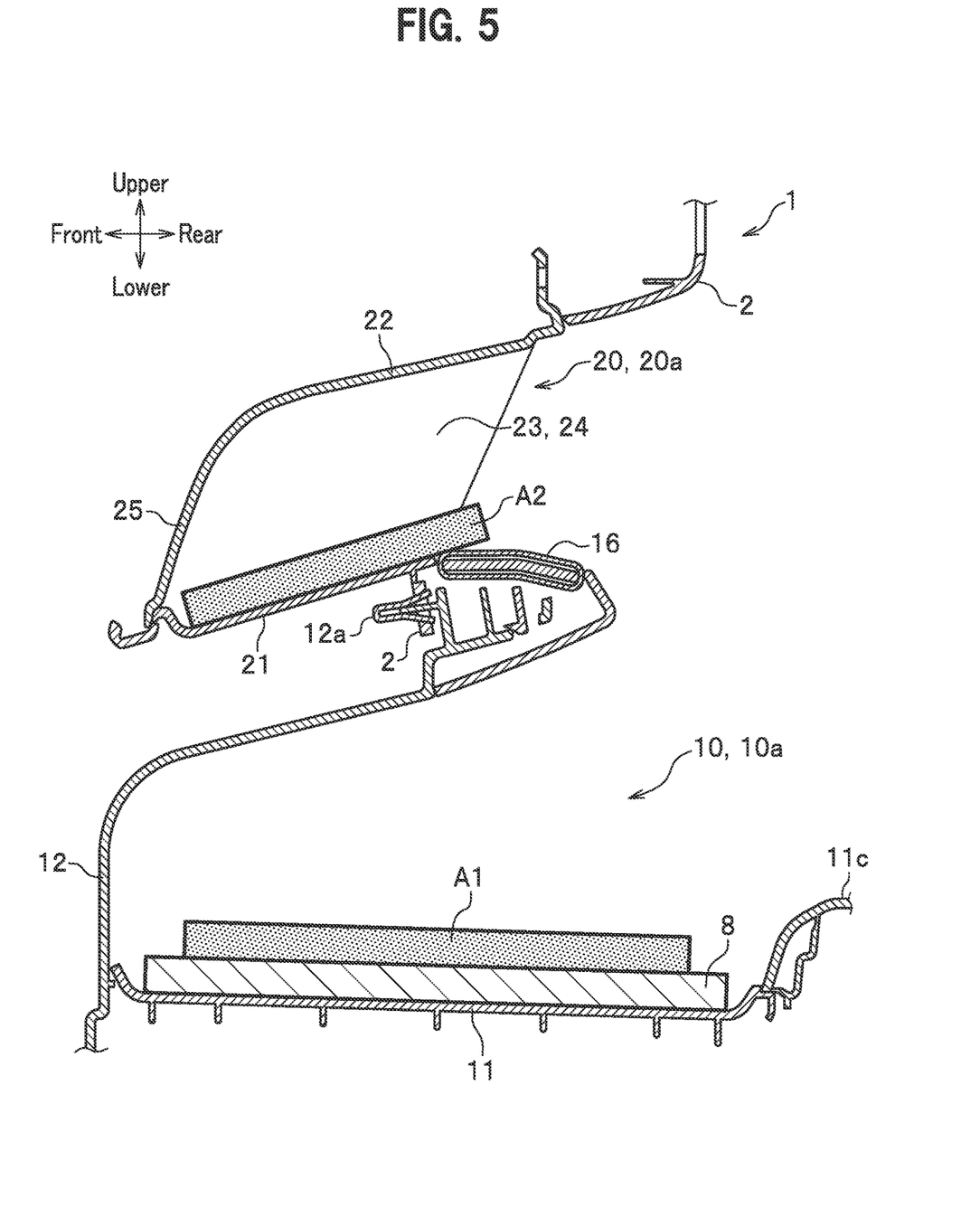
FIG. 5 is a schematic cross-sectional view of the vehicle storage structure according to the embodiment of the present invention.

The upper surface of a front portion of the bottom wall 11 serves as an article-placing portion of the first storage on which an article A1 is placed. The dimension in the vehicle width direction of the bottom wall 11 serving as the article-placing portion is approximately the same as the dimension in the vehicle width direction of the center console 3. As illustrated in FIG. 5, on the bottom wall 11 is provided a non-contact charging device 8. The non-contact charging device 8 transmits electric power to the article A1, which is an electronic device, in a non-contact manner.

At a rear portion of the bottom wall 11 (a below-mentioned frame portion in the present embodiment) is formed a hole 11a (see FIG. 3) through which the operation device 7 (see FIG. 2) is inserted. The bottom wall 11 (a below-mentioned connection-member main body in the present embodiment) has a plurality of engagement pieces 11b (see FIG. 3). The engagement pieces 11b are inserted into engagement portions 3a formed on the upper end of the center console 3 from the rear side and engaged so that the movements in the front direction and the up-down direction are restricted.

As illustrated in FIG. 5, at the front edge of the hole 11a of the bottom wall 11 is formed a protrusion 11c extending in the vehicle width direction. The protrusion 11c and the side rib 14 prevent the article A1 from falling off the first storage.

Figure 4:
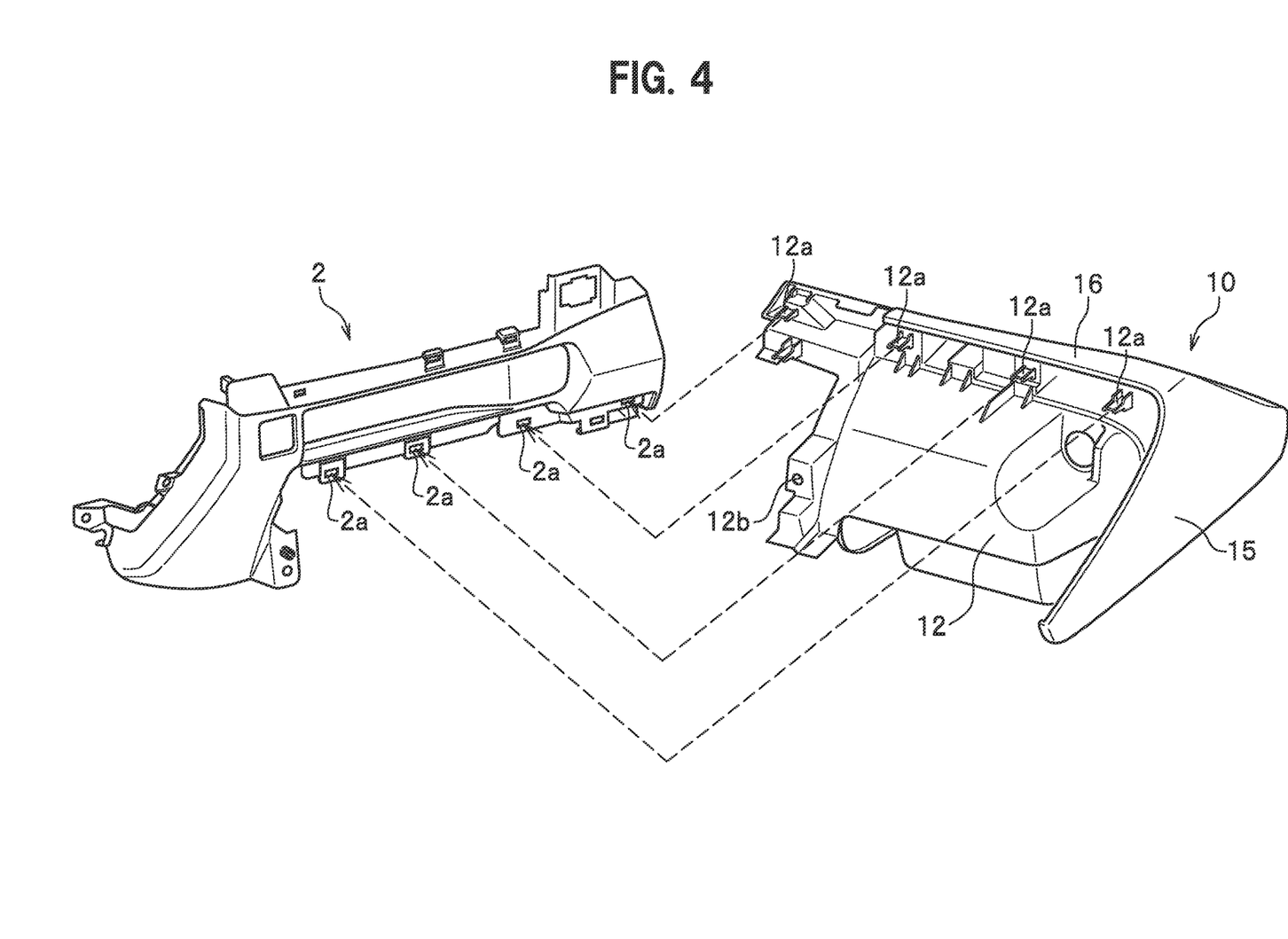
FIG. 4 is a schematic diagram for explaining how the instrument panel and the connection member are combined.

The front wall 12 is inclined such that the higher a position is, the further rearward it is positioned. As illustrated in FIG. 4, at upper end portions of the front wall 12 are formed a plurality of engagement pieces (clips) 12a protruding toward the front. The engagement pieces 12a are inserted into holes 2a formed in the instrument panel 2 from the rear side. The front wall 12 also has a hole 12b through which a pin, a screw, a protrusion formed on the instrument panel, or the like is inserted to fix the front wall 12 to the instrument panel 2.

As illustrated in FIGS. 1 and 2, the upper end of the side wall 15 is formed to connect the upper end of the front wall 12 and the upper end of the rear rib 13. Specifically, the side wall 15 has a triangular shape in side view, and the upper end of a rear portion of the side wall 15 (from an intermediate portion in the front-rear direction to the rear end) has an inclined portion 15a the height of which decreases toward the rear. The rear end of the inclined portion 15a is positioned on the rear side of the rear end (the protrusion 11c) of the first storage. The inclined portion 15a described above may be formed on the entire part in the front-rear direction of the side wall 15, or it may be formed on a part in the front-rear direction of the side wall 15. In the latter case, the side wall 15 has, on the front side of the inclined portion 15a, a high wall portion having the same height as the front end of the inclined portion 15a, or the side wall 15 has, on the rear side of the inclined portion 15a, a low wall portion having the same height as the rear end of the inclined portion 15a.

Figure 3:
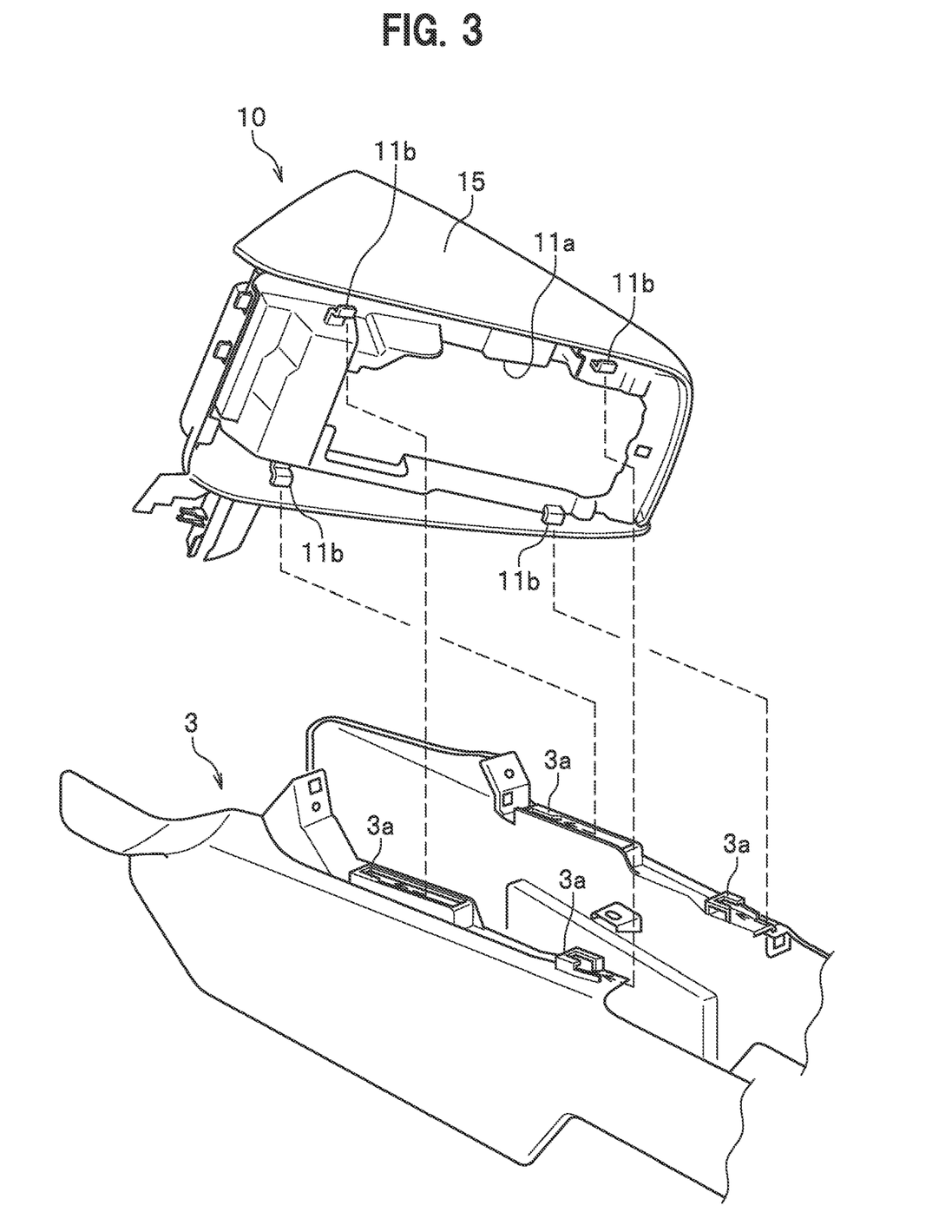
FIG. 3 is a schematic diagram for explaining how the center console and a connection member are combined.

In the present embodiment, the connection member 10 is formed by combining the connection-member main body, a panel portion, and the frame portion with one another. The connection-member main body integrally includes the front wall 12, rear rib 13, side rib 14, side wall 15, and extension wall 16. The panel portion is the front portion of the bottom wall 11, in other words, the article-placing portion of the first storage. The frame portion has a rectangular frame shape in plan view, which is the rear portion of the bottom wall 11, in other words, the peripheral edge portions of the hole 11a. Each side of the frame portion has a protruding shape protruding upward, and the front side of the frame portion is the protrusion 11c described earlier. The frame portion integrally includes a wall portion serving as the surface on the front passenger seat 5 side of the side rib 14. In FIG. 3, illustration of the panel portion and the frame portion is omitted.

<Second Storage>

As illustrated in FIG. 5, the vehicle storage structure 1 includes the second storage 20 located at a higher position than the connection member (first storage) 10 and formed in the instrument panel 2 (in the instrument panel 2 and at the upper end of the connection member 10 in the present embodiment). The second storage 20 has an opening 20a in the instrument panel 2. In the present embodiment, the upper edge and both side edges in the vehicle width direction of the opening 20a having a rectangular shape in front view are formed on the instrument panel 2, and the lower edge of the opening 20a is formed on the extension wall 16 of the connection member 10. The second storage 20 integrally includes a lower wall 21 and upper wall 22 extending forward from the instrument panel 2 and side walls 23 and 24 extending forward from the instrument panel 2 and connecting the ends in the vehicle width direction of the lower wall 21 and upper wall 22. The second storage 20 also integrally includes a front wall 25 connecting the front ends of the lower wall 21, upper wall 22 and side walls 23 and 24. The upper surface of the lower wall 21 is a first article placement section on which an article A2 is placed.

In addition, the second storage 20 includes the extension wall 16 of the connection member 10, which serves as a second article placement section extending rearward from the lower wall 21 (toward the passenger compartment). The coefficient of friction of the upper surface of the extension wall 16 serving as the second article placement section is larger than the coefficient of friction of the upper surface of the lower wall 21 serving as the first article placement section. Here, the extension wall 16 may be a member (for example, a decorative member) made of a material different from the material of the first article placement section (lower wall 21). As for the decorative member, for example, the extension wall 16 may be formed by decorative molding, or a skin material may be provided on the upper surface of the extension wall 16. A decorative member may be provided on the outer surfaces of the connection-member main body described above (the rear surface of the rear rib 13, the driver's-seat-4-side side surface of the side rib 14, the front-passenger-seat-5-side side surface of the side wall 15, and the upper surface of the extension wall 16). This configuration improves the sense of unity among the instrument panel 2, the connection member 10, and the center console 3.

The far-side end (front end) of the upper surface of the extension wall 16 serving as the second article placement section is approximately flush with the passenger-compartment-side end (rear end) of the upper surface of the lower wall 21 serving as the first article placement section. The extension wall 16 is inclined such that the height decreases toward the passenger compartment side (rear side). In other words, the height position of the passenger-compartment-side end (rear end) of the upper surface of the extension wall 16 serving as the second article placement section is lower than the height position of the far-side end (front end) of the upper surface of the extension wall 16.

<Usage Example of Each Storage>

The occupant of the driver's seat 4 places his/her article (for example, an electronic device (mobile terminal) or the like) A1 on the bottom wall 11 (specifically, the non-contact charging device 8) of the first storage 10 through the opening 10*a*. The stored article A1 in the first storage 10 is charged by the non-contact charging device 8.

Here, between the front passenger seat 5 and the first storage 10 is the side wall 15 and the operation device 7. Hence, the occupant of the front passenger seat 5 places his/her article (for example, an electronic device (mobile terminal) or the like) A2 on the lower wall (first article placement section) 21 and the extension wall (second article placement section) 16 of the second storage 20 through the opening 20*a*. The article A2 placed on the lower wall 21 slides forward on the lower wall 21 and is stored in the second storage 20. The article A2 stored in the second storage 20 is connected to the connection terminal 6 via a not-illustrated cable or the like and charged by the vehicle battery.

The article A2 stored in the second storage 20 is placed on the lower wall (first article placement section) 21 and the extension wall (second article placement section) 16 of the second storage 20. Hence, when the article A2 stored in the second storage 20 seeks to move rearward due to vehicle's acceleration or deceleration or the like, the article A2 is held stably within the second storage 20 by the frictional resistance of the extension wall 16.

In addition, since the passenger-compartment-side end of the extension wall 16 is lower than the far-side end, the occupant, utilizing the fact that the passenger-compartment-side end of the extension wall 16 is lower, can take the article A2 out of the second storage 20 by holding the article A2 by nipping it from both upper and lower surfaces and sliding the article A2 rearward on the lower wall 21 via the state in which the article A2 is separated from the extension wall 16 but in contact with the lower wall 21. Here, the extension wall 16 having a high frictional resistance suitably helps the occupant to hold the article A2.

Meanwhile, in the case where two storages are lined up in the front-rear direction at the same height as in conventional techniques, the occupant needs to look at the storages when he/she puts in or takes out an article to prevent him/her from selecting a wrong storage or a wrong article. In addition, the sizes of dedicated storages are small in this case, and hence, relatively large articles (for example, a wallet and the like) are put in or taken out of common storages. Thus, there remains a possibility of selecting a wrong article.

In contrast, the vehicle storage structure 1 according to the embodiment of the present invention includes the two storages located at different height positions, and the first storage is formed to be easy for the occupant of the driver's seat 4 to use and to prevent it from being used by the occupant of the front passenger seat 5. Thus, it is possible to solve the problems described above.

The vehicle storage structure 1 according to the embodiment of the present invention is a vehicle storage structure 1 including a storage (second storage 20) having an opening 20*a* in a design surface of a vehicle interior member (instrument panel 2), in which the storage includes a first article placement section (lower wall 21) and a second article placement section (extension wall 16) located on a passenger compartment side of the first article placement section, and the coefficient of friction of the second article placement section is larger than the coefficient of friction of the first article placement section.

With this configuration, even in the case of storing an article A2 longer than the distance from the far-side end to the passenger-compartment-side end of the first article placement section, the vehicle storage structure 1 is capable of stably holding the article A2 within the storage due to the second article placement section having a high coefficient of friction. In addition, in the vehicle storage structure 1, when the article A2 is put in or taken out, the article A2 can slide on the first article placement section, being away from the second article placement section. This improves the usability. Since in the vehicle storage structure 1, the second article placement section having a high coefficient of friction is limitedly disposed on the passenger compartment side of the storage, it is possible to achieve both better performance for holding the article A2 and lower cost.

In the vehicle storage structure 1, the first article placement section is formed of a resin member.

Thus, in the vehicle storage structure 1, when the article A2 is put in or taken out, the article A2 can slide easily on the first article placement section, being away from the second article placement section. This improves the usability more.

In the vehicle storage structure 1, the second article placement section is formed of a member made of a material different from a material of the first article placement section.

Thus, in the vehicle storage structure 1, since a decorative member having a decorative appearance serves also as the second article placement section, it possible to reduce the cost more.

In the vehicle storage structure 1, the vehicle interior member is an instrument panel 2, the instrument panel 2 is connected to a center console 3 via a connection member 10, the connection member 10 includes an extension portion (extension wall 16) extending in a vehicle width direction, and the second article placement section is disposed on the extension portion.

Thus, in the vehicle storage structure 1, since a member serving as the second article placement section and made of a material different from the material of the first article placement section is provided at the extension portion, it is possible to improve a sense of unity among the instrument panel 2, the connection member 10, and the center console 3.

In the vehicle storage structure 1, a far-side end of the second article placement section is approximately flush with a passenger-compartment-side end of the first article placement section.

Thus, in the vehicle storage structure 1, since there is no height difference between the first article placement section and the second article placement section, a stored article A2 is brought into surface contact with the second article placement section, and this improves the performance for holding the article A2.

In the vehicle storage structure 1, the height position of a passenger-compartment-side end of the second article placement section is lower than the height position of the far-side end of the second article placement section.

Thus, in the vehicle storage structure 1, since it is easy to hold the lower surface of the passenger-compartment-side end of the stored article A2 with fingers, when the article A2 is put in or taken out, the article A2 can slide easily on the first article placement section, being away from the second article placement section. This improves the usability more. In addition, in the case where the second article placement section in the vehicle storage structure 1 is, for example, a skin material, fingers coming into contact with the second article placement section does not cause tapping sound. Thus, it is possible to improve the quietness.

It is understood that the foregoing description is that of the preferred embodiments of the invention and that various changes and modifications may be made thereto without departing from the spirit and scope of the invention as defined in the appended claims. For example, in the case where the instrument panel 2 and the center console 3 are separated in the front-rear direction, at least one of the first storage and the second storage 20 may be provided in front of the center console 3 (between the instrument panel 2 and the center console 3 in the front-rear direction).

In addition, the article-placing portion (panel portion) in the first storage may be provided integrally with the center console 3 not with the connection member 10.

Further, the second storage 20 may be provided on an interior member other than the instrument panel 2.

What is claimed is:

1. A vehicle storage structure for a vehicle, the vehicle storage structure comprising a vehicle interior member and a storage, wherein
    the vehicle interior member has a design surface,
    the storage has an opening, a first article placement section, and a second article placement section,
    the opening is located on the design surface,
    the second article placement section is disposed such that the second article placement section is more outward toward a passenger compartment of the vehicle than the first article placement section, and
    the first article placement section has a coefficient of friction less than a coefficient of friction of the second article placement section.

2. The vehicle storage structure according to claim 1, wherein
    the first article placement section comprises a resin member.

3. The vehicle storage structure according to claim 1, wherein
    the second article placement section comprises a member containing a material which is different from a material of the first article placement section.

4. The vehicle storage structure according to claim 3, wherein
    the vehicle interior member includes an instrument panel,
    the instrument panel is connected to a center console by a connection member,
    the connection member comprises an extension portion extending in a vehicle width direction, and
    the extension portion serves as the second article placement section.

5. The vehicle storage structure according to claim 1, wherein
    the first article placement section has a first end portion and a second end portion located outwardly from the first end portion,
    the second article placement section has a third end portion and a fourth end portion located outwardly from the third end portion, and
    the first end portion is substantially flush with the fourth end portion.

6. The vehicle storage structure according to claim 1, wherein
    the second article placement section has a third end portion and a fourth end portion located outwardly from the third end portion, and
    the third end portion is located lower than the fourth end portion.

7. The vehicle storage structure according to claim 2, wherein
    the second article placement section comprises a member containing a material which is different from a material of the first article placement section.

8. The vehicle storage structure according to claim 7, wherein
    the vehicle interior member includes an instrument panel,
    the instrument panel is connected to a center console by a connection member,
    the connection member comprises an extension portion extending in a vehicle width direction, and
    the extension portion serves as the second article placement section.

9. The vehicle storage structure according to claim 2, wherein
    the first article placement section has a first end portion and a second end portion located outwardly from the first end portion,
    the second article placement section has a third end portion and a fourth end portion located outwardly from the third end portion, and
    the first end portion is substantially flush with the fourth end portion.

10. The vehicle storage structure according to claim 3, wherein
    the first article placement section has a first end portion and a second end portion located outwardly from the first end portion,
    the second article placement section has a third end portion and a fourth end portion located outwardly from the third end portion, and
    the first end portion is substantially flush with the fourth end portion.

11. The vehicle storage structure according to claim 7, wherein
    the first article placement section has a first end portion and a second end portion located outwardly from the first end portion,
    the second article placement section has a third end portion and a fourth end portion located outwardly from the third end portion, and
    the first end portion is substantially flush with the fourth end portion.

12. The vehicle storage structure according to claim 4, wherein
    the first article placement section has a first end portion and a second end portion located outwardly from the first end portion,
    the second article placement section has a third end portion and a fourth end portion located outwardly from the third end portion, and
    the first end portion is substantially flush with the fourth end portion.

13. The vehicle storage structure according to claim 8, wherein
    the first article placement section has a first end portion and a second end portion located outwardly from the first end portion,
    the second article placement section has a third end portion and a fourth end portion located outwardly from the third end portion, and
    the first end portion is substantially flush with the fourth end portion.

14. The vehicle storage structure according to claim 2, wherein
    the second article placement section has a third end portion and a fourth end portion located outwardly from the third end portion, and the third end portion is located lower than the fourth end portion.

15. The vehicle storage structure according to claim 3, wherein the second article placement section has a third end portion and a fourth end portion located outwardly from the third end portion, and the third end portion is located lower than the fourth end portion.

16. The vehicle storage structure according to claim 7, wherein the second article placement section has a third end portion and a fourth end portion located outwardly from the third end portion, and the third end portion is located lower than the fourth end portion.

17. The vehicle storage structure according to claim 4, wherein the second article placement section has a third end portion and a fourth end portion located outwardly from the third end portion, and the third end portion is located lower than the fourth end portion.

18. The vehicle storage structure according to claim 8, wherein the second article placement section has a third end portion and a fourth end portion located outwardly from the third end portion, and the third end portion is located lower than the fourth end portion.

19. The vehicle storage structure according to claim 5, wherein the third end portion is located lower than the fourth end portion.

20. The vehicle storage structure according to claim 9, wherein the third end portion is located lower than the fourth end portion.

\* \* \* \* \*